United States Patent Office 3,471,370
Patented Oct. 7, 1969

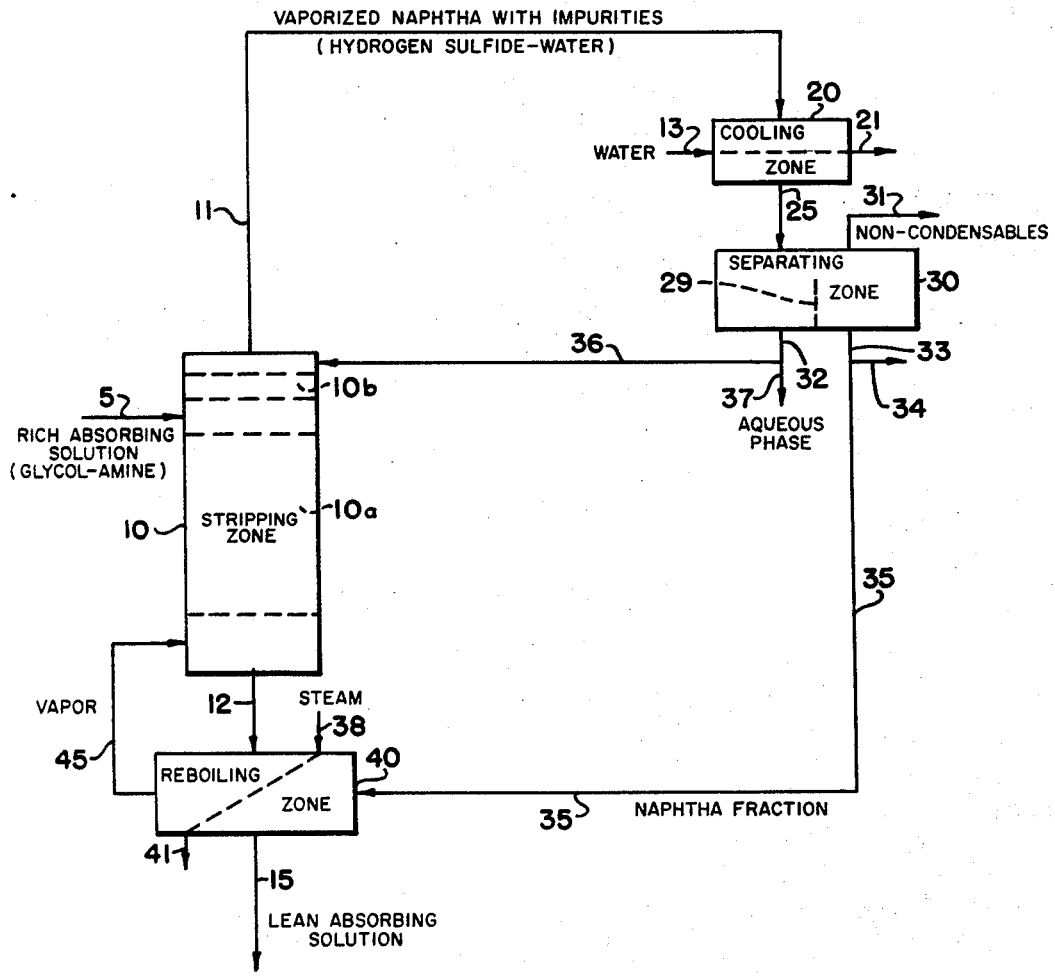

3,471,370
METHOD FOR REGENERATING GLYCOL-AMINE ABSORBING SOLUTIONS
John C. Jubin, Jr., Wallingford, Pa., assignor to Atlantic Richfield Company, Philadelphia, Pa., a corporation of Pennsylvania
Filed Apr. 20, 1966, Ser. No. 543,965
Int. Cl. B01d 3/34
U.S. Cl. 203—49          10 Claims

ABSTRACT OF THE DISCLOSURE

A method for removing water from an aqueous glycol-amine solution by distilling the solution while stripping with a naphtha fraction of petroleum hydrocarbons.

Background of the invention

This invention generally relates to the removal of water from aqueous solutions of diethylene glycol and mono-ethanolamine. More specifically, this invention relates to the regeneration of solutions of the type last mentioned, termed glycol-amine absorbing solutions, which are used in petroleum refining operations to remove undesirable sulfur compounds and also water vapor from refinery gas streams such as natural gas and the like. The invention is particularly directed to an improved method for regenerating glycol-amine absorbing solutions used in desulfurizing and dehydrating hydrogen-containing gas streams intended for recycling to catalytic petroleum reforming operations.

In the refining of petroleum, it often is necessary or desirable to remove hydrogen sulfide or water vapor or both from gas streams such as natural gas and the like. A method commonly employed for this purpose is the intimate contacting or "scrubbing" of the gas stream with an aqueous solution of diethylene glycol and monoethanolamine. For a general description of this method, see, for example, the article titled "High Purity Natural Gas by the Glycol-Amine Process," by W. F. Chapin, appearing in the Petroleum Refiner for June 1947. By this method, hydrogen sulfide and water are removed from the gas stream by absorption into the solution. Removal of the hydrogen sulfide and excess water from the absorbing solution, in order to regenerate the solution for reuse, is commonly accomplished by a conventional fractional distillation of the solution at a pressure above atmospheric pressure.

The catalytic reforming of petroleum hydrocarbon fractions in the presence of hydrogen provides another illustration of the use of glycol-amine absorbing solutions and a particularly beneficial application for the method of the present invention. In such operations, there is produced a gas stream which, because it contains hydrogen, it is desired to recycle to the reforming operation. However, if the hydrocarbon charge to the reforming operation contains sulfur compounds, and has not been subjected to a hydrogen pretreatment, the gas stream from the reforming operation will contain hydrogen sulfide as well as water vapor. The presence of the hydrogen sulfide in a recycle gas stream would cause corrosion problems and in other ways adversely affect the reforming process. Accordingly, it is common to "scrub" the gas stream, prior to recycling, by passing it through an absorber or "scrubber" in which it is intimately contacted with a liquid absorbent consisting essentially of an aqueous solution of diethylene glycol and monoethanolamine. In this manner, hydrogen sulfide is removed from the gas and its water content is reduced. The quantity of water remaining in the gas stream is, in large measure, determined by the concentration of water in the absorbing solution.

The glycol-amine absorbing solution in common use in petroleum refining operations consists essentially, on a dry basis, of approximately 85 percent by weight of diethylene glycol and approximately 15 percent monoethanolamine. On an over-all, or "wet," basis, the absorbing solution usually contains from about 5 to about 10 weight percent water. Absorbing solutions with water contents falling within the stated usual range permit of a satisfactory removal of hydrogen sulfide and ordinarily also of a satisfactory reduction in the water content of the treated gas stream. Thus, with absorbing solutions containing from about 5 to about 10 weight percent of water, the water content of the treated gas stream can be reduced to a concentration in the range of from about 600 to about 800 parts per million by weight (p.p.m.), and such a water content in the "scrubbed" gas stream ordinarily is satisfactory. However, under certain circumstances, it is necessary or desirable to achieve an even lower water content in the "scrubbed" gas stream.

Such a requirement as last above noted exists in connection with hydrogen-containing gas streams intended for recycling to catalytic reforming operations employing certain types of catalysts which are adversely affected by the presence of water in the surrounding atmosphere. For example, the active life of the reforming catalyst commercially known as RD 150, a catalyst containing 0.35 to 0.6 weight percent platinum on eta alumina, has been found to be reduced significantly by the presence of an "excessive" water content in the recycle gas stream. In particular, for use in connection with such catalyst systems, it is desirable to employ a recycle hydrogen stream containing not more, and preferably less, than 200 p.p.m. of water. This is in marked contrast to a water content in the range of from about 600 to about 800 p.p.m. which normally is achieved by the use of common absorbing solutions and conventional regeneration systems.

It further has been found that a gas stream water content of the reduced magnitude above mentioned can be achieved with glycol-amine absorbing solutions only if the water content of that solution is maintained at approximately 2 percent by weight or less. This figure contrasts markedly with the 5 to 10 weight percent water content commonly achieved by the use of conventional regeneration techniques. Unfortunately, it is not feasible to reduce the water content of glycol-amine absorbing solutions below 5 percent by fractional distillation at pressures above atmospheric, for the reason that the excessive temperatures required tend to cause a decomposition of ingredients of the solutions into corrosive products. It also is not practical or economical to attempt a further reduction in water content by means of fractional distillation under vacuum, because of the increased costs involved and the need for additional process steps and equipment.

Summary of the invention

In view of the above, a principal object of the present invention is to provide an improved method for reducing the water content of aqueous solutions of diethylene glycol and monoethanolamine. Another object of the invention is to provide an improved method for regenerating glycol-amine absorbing solutions used in dehydrating and desulfurizing gas streams normally encountered in the refining of petroleum. A further object is to provide an improved method for regenerating glycol-amine absorbing solutions used in dehydrating and desulfurizing hydrogen-containing gas streams intended for recycling to catalytic reforming operations employing catalysts which are adversely affected by the presence of water. Still another object is to provide an improved method whereby the water content of a common glycol-amine absorbing solution can be reduced below that heretofore obtainable by conventional regeneration means. These and other objects of the invention will be more fully understood from the following detailed description of the invention, to be read in conjunction with the accompanying drawing, which constitutes a schematic flow diagram illustrating practice of the method of the present invention.

In accordance with the present invention, the water content of glycol-amine absorbing solutions is reduced to approximately 2 weight percent and even less, and substantially all of the acid gases such as hydrogen sulfide are removed, by subjecting the so-called rich absorbing solution to distillation in the presence of a naphtha fraction of petroleum hydrocarbons. This enhanced reduction in water content is achieved at temperatures sufficiently low to avoid decomposition, and is achieved without the expense or complications involved in the use of distillation pressures below atmospheric.

The naphtha fraction of petroleum hydrocarbons suitable for use in the practice of the present invention can be any fraction of petroleum hydrocarbons having an atmospheric boiling range falling within the so-called naphtha range of from about 100 to about 400° F. However, as noted above, the method of the present invention is particularly suitable for regenerating glycol-amine absorbing solutions used in scrubbing hydrogen-containing gas streams intended for recycling to catalytic reforming operations of the type employing a catalyst whose active life is substantially reduced by the presence of excessive water in the recycle hydrogen stream. In a preferred embodiment of this invention, as applied to such catalytic reforming operations, the naphtha fraction of petroleum hydrocarbons used in the naphtha distillation or stripping of the rich glycol-amine absorbing solution is itself derived from the hydrogen-containing gas stream produced in catalytic reforming operations. Specifically, such naphtha fraction consists essentially of an aromatic naphtha fraction of petroleum hydrocarbons produced during catalytic reforming and carried in a low concentration in the hydrogen-containing gas stream therefrom. This naphtha fraction is removed from the gas stream by absorption in the glycol-amine absorbing solution, and is further and coincidentally separated from said solution by distillation, to become available for use in accordance with the present invention. Such naphtha fractions commonly contain an unusually high proportion of aromatic hydrocarbons, for example, up to about 45 percent by weight, and exhibit an atmospheric boiling range falling within the over-all boiling range from about 150 to about 350° F.

In practicing the present invention, the rich glycol-amine absorbing solution, containing water and possibly also hydrogen sulfide and naphtha absorbed from the gas stream in the scrubber, is introduced into the upper region of a stripping zone. The stripping zone is designed and internally equipped to provide intimate countercurrent contact between a downwardly flowing liquid phase and an upwardly flowing vapor phase. Conventional processing equipment, such as a distillation tower containing trays or packing, can be employed as the stripping zone. In operation, the rich absorbing solution moves downwardly by gravity through the stripping zone. All or a significant portion of the liquid phase leaving the bottom of the stripping zone is introduced into a reboiling zone, to which all of the naphtha fraction, in liquid state, also is introduced.

The reboiling zone is adapted to vaporize substantially all of the naphtha fraction and a significant quantity of the water and possibly other components of the solution. Equipment of conventional design and construction can be employed, and heat is introduced through the use of steam or the like. Vapors from the reboiling zone are introduced into the lower region of the stripping zone, and move upwardly in intimate countercurrent contact with the downwardly flowing liquid phase. In practice, the reboiling zone can be embodied in the same piece of equipment as the stripping zone, or it can be embodied in an independent unit.

It has been found satisfactory to carry out the distillation and stripping operations in the stripping zone at a pressure in the range of from about 5 to about 25 pounds per square inch, gauge (p.s.i.g.). At these pressures, a temperature in the reboiling zone in the range of from about 300 to about 340° F. has been found generally adequate, although higher or lower temperatures can on occasion be employed. Also, while the temperature of the vapor flowing upwardly and out of the top of the stripping zone will depend on factors such as tower design, heat input, boiling range of naphtha fraction, and the like, temperatures in the range of from about 180 to about 260° F. would be expected with the above pressure range and have been experienced in actual operation with satisfactory results.

The naphtha fraction is introduced in an amount sufficient, according to the method of the present invention, to achieve the desired reduction in water content in the absorbing solution being regenerated. In practice, the amount required will depend upon such factors as the composition and properties of the naphtha fraction employed, the operating pressure of the stripping zone, and the quantity of water necessary to be removed from the absorbing solution in order to achieve the desired water content therein. With an aromatic naphtha fraction derived from catalytic reforming operations, and having the properties specified above, and with a rich absorbing solution containing in the neighborhood of from 5 to 6 weight percent of water and to be reduced to and maintained at about 2.5 weight percent of water, a suitable stripping quantity of the naptha fraction has been determined to fall within the range of from about 0.200 to 0.275, and more commonly in the range of from about 0.225 to about 0.250, gallon of the naphtha fraction per gallon of rich absorbing solution introduced to the stripping zone.

The vapors removed from the top of the stripping zone, consisting essentially of water, naphtha, hydrogen sulfide and small amounts of the components of the absorbing solution, are subjected to cooling in suitable conventional equipment, such as in a water-cooled condenser, to effect a condensation of the condensable components. Noncondensable components, such as the acid gas comprising mainly hydrogen sulfiide, are separated from the condensed liquid and otherwise disposed of. The liquid resulting from condensation comprises two immiscible phases, the one being aqueous in nature and the other predominantly hydrocarbon. The hydrocarbon phase consists essentially of the naphtha fraction, while the aqueous phase consists essentially of water and small amounts of monoethanolamine and possibly also of diethylene glycol. In practice, the two liquid phases are separated and a portion of the aqueous phase is reintroduced into the upper region of the stripping zone as reflux, while the remainder thereof is otherwise disposed of. The recovered naphtha fraction is available for reuse, and the required portion of it can be reintroduced into the reboiling zone.

Brief description of the drawing

In order to illustrate schematically the sequence of operations embodied in the method of the present invention, reference is now made to the accompanying figure. In the figure, rich absorbing solution consisting essentially of monoethanolamine, diethylene glycol and water, and possibly also containing acid gases such as hydrogen sulfide and a fraction of petroleum hydrocarbons falling within the naphtha range, is introduced through line 5 into the upper region of stripping zone 10. In stripping zone 10, liquid flows downwardly in intimate countercurrent contact with upwardly flowing vapors introduced into the lower region of stripping zone 10 through line 45 connected to reboiling zone 40. Liquid reaching the lower portion of the stripping zone is removed through line 12 and introduced into reboiling zone 40. Lean absorbing solution is withdrawn from reboiling zone 40 through line 15 and can be returned to the absorber, or "gas scrubber," for reuse in dehydrating and desulfurizing the gas stream.

The naptha fraction of petroleum hydrocarbons, in liquid state, is introduced to reboiling zone 40 through line 35. Reboiling zone 40 is provided with a source of heat, such as steam coils, to which steam is supplied through line 38 and from which steam and condensate are removed through line 41. In reboiling zone 40, the naphtha fraction and a portion of the water and possibly other volatile components of the absorbing solution are vaporized and, as vapors, are introduced through line 45 into the lower region of the stripping zone 10, where they flow upwardly in intimate countercurrent contact with the descending liquid phase. Vapors and gases reaching the top of the stripping zone are removed through line 11 and introduced into cooling zone 20, which is provided with cooling means, such as a pipe coil, to which cooling water is supplied through line 13 and from which spent cooling water is removed through line 21. Stripping zone 10 can be equipped with conventional contacting means 10a, such as packing or plates, and conventional liquid-vapor separating means 10b, such as wire mesh demister.

The condensed liquid and the noncondensable gases are removed from cooling zone 20 through line 25 and introduced into separating zone 30. In separating zone 30 the noncondensable gases, comprising mainly acidic components such as hydrogen sulfide, are removed through line 31 and disposed of. The condensed liquid consists of two immiscible phases, a heavier aqueous phase and a lighter hydrocarbon phase. Separating zone 30 is internally equipped with conventional means, such as transverse vertical baffle 29, to effect a separation of the two immiscible phases. The aqueous phase accumulates in one of the two regions in separating zone 30 created by baffle 29, and is removed through line 32. A portion of this aqueous phase is reintroduced as reflux into the upper region of stripping zone 10 through line 36, while the balance thereof, if any, is otherwise disposed of through line 37. The hydrocarbon phase accumulates in the other of the two regions of separating zone 30, and is removed through line 33 and reintroduced into reboiling zone 40 through line 35. Any excess of the naphtha fraction, such as may be generated if the rich solution also contains a significant quantity of naphtha, is drawn off through line 34 and disposed of to storage or the like.

Description of the drawing

In order to illustrate a specific embodiment of the present invention, the method of the invention was applied to the regeneration of a glycol-amine absorbing solution used in scrubbing a particular hydrogen-containing gas stream. The hydrogen-containing gas stream was derived from, and intended for recycling to, a catalytic reforming operation employing the catalyst commercially designated RD 150. The active life of this catalyst was known to be adversely affected by the presence of water in the recycle hydrogen stream at a concentration greater than 200 p.p.m. by weight. Under prior conventional practice, the hydrogen recycle stream had a water content ranging from about 600 to about 800 p.p.m., after scrubbing with a lean glycol-amine absorbing solution containing from about 6 to about 9 weight percent water, and which had been regenerated in accordance with conventional techniques. A water content in the lean solution of approximately 2 weight percent or less is necessary to effect, during absorption or scrubbing, a reduction in the water content of the hydrogen recycle stream to 200 p.p.m. or less. Conventional regeneration techniques, for technical and economic reasons, were found not suitable to produce a lean glycol-amine absorbing solution containing approximately 2 percent or less of water.

In accordance with the practice of the present invention, the rich absorbing solution consisting essentially of approximately 18 percent monoethanolamine, approximately 80 percent of diethylene glycol, and approximately 2 percent water, all by weight, was preheated to a temperature in the range of from about 215 to about 220° F. and continuously introduced into the upper region of a stripping zone consisting of a packed distillatiton tower. It is to be noted that the water content of the circulating solution previously had been brought down from the 6 to 9 percent normally experienced by operating with naphtha to the reboiler for several hours to reduce the water in the whole system to a steady state value. The tower had a diameter of 30 inches, and was packed with 1-inch Raschig rings to a height of 30 feet. The rich solution was introduced at a rate of approximately 13.2 gallons per minute.

The bottom section of the tower was connected with a reboiling zone, consisting of a separate reboiler vessel heated with steam at 150 p.s.i.g. flowing continuously through coils at the rate of approximately 1,175 pounds per hour. An aromatic naphtha fraction of petroleum hydrocarbons, derived from the above-mentioned reforming operation, was continuously introduced to the reboiler in a liquid state at a rate of from about 3.0 to about 3.3 gallons per minute. The liquid phase reaching the bottom of the tower was continuously removed and also introduced into the reboiler. Temperature in the reboiler was maintained at approximately 318 to 320° F. Tower pressure was maintained at approximately 15 p.s.i.g. In the reboiler, the naphtha fraction and a portion of the water and possibly of other volatile components of the absorbing solution were vaporized, and the resulting vapors were continuously introduced into the lower region of the packed tower where they moved upwardly in intimate countercurrent contact with the descending liquid phase.

Vapors and noncondensable gases reaching the top of the tower after passing through a demister were removed and cooled in a water-cooled condenser. The temperature of the gases and vapors leaving the top of the tower was observed to be in the range of from about 222 to about 235° F. The temperature of the condensed liquids and gases leaving the condenser was in the range of from about 115 to about 135° F.

The mixture of condensed liquids and noncondensable gases was then introduced into a horizontal cylindrical settling tank provided with an internal vertical transverse baffle. The liquid introduced into such separator consisted of two phases, an aqueous phase and a predominantly hydrocarbon phase. The aqueous phase was accumulated on one side of the baffle, and consisted essentially of water and approximately 6 to 7 percent by weight of monoethanolamine. A portion of this aqueous phase was introduced as reflux into the upper region of the packed tower at a rate of from about 0.16 to about 0.20 gallon per minute. The balance of the aqueous phase, aggregating about 2 to 3 gallons per hour, was otherwise disposed of. Noncondensable gases, comprising from 50 to 75 percent by weight of hydrogen sulfide, were vented from the top of the separating vessel at a rate observed to be in the range of from about 700 to about 900 standard cubic feet per hour (s.c.f.h.). The predominantly hydrocarbon phase consisted essentially of the naphtha fraction, and was accumulated on the side of the baffle opposite the aqueous phase. The accumulated naphtha fraction was removed from the separating vessel and reintroduced as liquid into the reboiler at a rate in the range of from about 3 to about 3.3 gallons per minute. Accumulated naphtha in excess of that required for such stripping was withdrawn for storage or other use.

The lean solution accumulated in the reboiler was withdrawn and, before being reintroduced into the gas scrubber or absorber, its sensible heat content was used to preheat the rich absorbing solution being fed to the tower. The lean solution produced in accordance with the above-described improved regeneration technique had a water content in the range of from about 1.6 to about 1.8 percent. When this lean solution, having the reduced water content noted, was used in scrubbing the above-mentioned recycle hydrogen stream, the water content of the latter was reduced to less than 200 p.p.m. In contrast, in previous operation of the absorber under identical flows and conditions except that the lean absorbing solution contained from 6 to 9 percent water, the scrubbed hydrogen recycle stream had a water content ranging from 600 to about 800 p.p.m. In both cases, the hydrogen sulfide content of the hydrogen recycle stream was reduced from a figure in the range of from about 8 to 14 grains per hundred standard cubic feet, to a figure below 1 grain per hundred standard cubic feet.

While the above embodiment illustrates the application of the present invention to the regeneration of a glycolamine absorbing solution used for scrubbing a water- and hydrogen sulfide-containing gas stream of a particular type, it is apparent that the method of the present invention can be applied to the dehydration and, if necessary, the desulfurization, of glycol-amine absorbing solutions in general, and also to the removal of water from any glycol solution which is unstable during distillation at normal pressures above atmospheric. All such applications and embodiments are contemplated as within the scope of the present invention.

The invention claimed is:
1. Method for removing water and sulfur impurities from a glycol-amine absorbing solution used in dehydrating and desulfurizing a hydrogen containing gas stream for recycle to a petroleum forming operation, comprising the steps:
 (a) stripping said solution with a naphtha fraction of petroleum while distilling said solution in a vessel to effect separation of said water and sulfur impurities,
 (b) recovering said stripping naphtha and said separated water and sulfur impurities from said vessel as vapor,
 (c) separating said naphtha from said water and sulfur impurities, and
 (d) recycling said recovered naphtha as a vapor into the lower region of the vessel for said stripping step.
2. The method of claim 1 wherein said naphtha is separated from said water and sulfur impurities by condensing said vapor in a condenser where said sulfur impurities are removed as vapor, and subsequently separating the condensed water and naphtha fractions by decantation.
3. The method of claim 1 wherein the stripped glycol amine solution is removed from said vessel into a reboiler and said separated naphtha liquid is introduced into said reboiler for vaporization prior to recycling to said vessel.
4. The method of claim 3 wherein the temperature in said reboiler is between 300 and 340° F.
5. The method of claim 3 wherein said liquid naphtha is flashed in said reboiler and removes water vapors from said glycol amine in said reboiler.
6. The method of claim 1 wherein the stripped glycol amine solution contains less than 2.5% water by weight.
7. The method of claim 1 wherein said glycol is diethylene glycol and said amine is monoethanolamine.
8. The method of claim 1 wherein said distillation and stripping are conducted at a pressure above atmospheric pressure.
9. The method according to claim 1 wherein said naphtha fraction is used in an amount within the range of from about 0.200 to about 0.275 gallon per gallon of the glycol-amine solution, and said distillation and stripping are conducted at a pressure within the range of from about 5 to about 25 p.s.i.g.
10. The method according to claim 1 wherein said naphtha fraction is used in an amount within the range of from 0.225 to about 0.250 gallon per gallon of said glycol-amine solution, and said distillation and stripping are conducted at a pressure of approximately 15 p.s.i.g.

References Cited
UNITED STATES PATENTS

| 2,177,068 | 10/1939 | Hutchinson | 55—31 |
| 2,915,881 | 12/1959 | Irvine | 62—17 |
| 3,001,372 | 9/1961 | Kurata | 62—17 |
| 3,242,681 | 3/1966 | Shaievitz | 62—23 |
| 3,266,219 | 8/1966 | Woertz | 55—48 |
| 2,781,863 | 2/1957 | Bloch et al. | |
| 3,105,748 | 10/1963 | Stahl | 203—18 |
| 3,348,601 | 10/1967 | Hill | 55—32 |

OTHER REFERENCES

W. F. Chapin, High Purity Natural Gas by the Glycol-Amine Process, Petroleum Refiner, June 1947, pp. 109 to 112.

The Fluor Corp., Amine Gas Treating, Petroleum Refiner, September 1953, vol. 32, No. 9, p. 124.

NORMAN YUDKOFF, Primary Examiner

DAVID EDWARDS, Assistant Examiner

U.S. Cl. X.R.

55—32; 62—17; 203—68; 208—188, 236